July 21, 1959

C. E. MAHAM 2,895,705

HOLD-DOWN DEVICE

Filed July 7, 1955

INVENTOR.
CARL E. MAHAM,
BY Allen & Allen
ATTORNEYS.

United States Patent Office 2,895,705
Patented July 21, 1959

2,895,705

HOLD-DOWN DEVICE

Carl E. Maham, Williamsburg, Ohio

Application July 7, 1955, Serial No. 520,432

4 Claims. (Cl. 248—361)

My invention resides in the provision of a novel hold-down device particularly adapted for maintaining boats and the like on trailers.

An important object of my invention is to provide very simple means which are more or less self-adjusting in the matter of distributing the hold-down pressure necessary to maintain a boat or the like on a trailer.

It is also an object of my invention to provide hold-down means which are capable of accomodating objects of varying size.

A further object of my invention is to provide hold-down means by which proper pressure may be obtained where needed without marring the boat or other object being maintained on the trailer.

It is also an object of my invention to provide hold-down means which are extremely simple to use, economical to manufacture and of rugged construction.

Although I shall described my hold-down means as used in connection with maintaining a boat on a trailer it is to be understood that the mechanism is capable of maintaining other objects in place on a suitable base whether the object be a boat or not and whether the base be a trailer or not.

Figure 1:
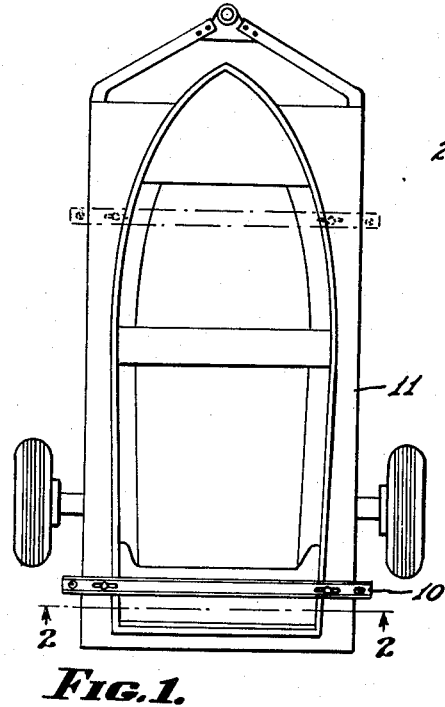
Figures 4, 5, 6, 7:
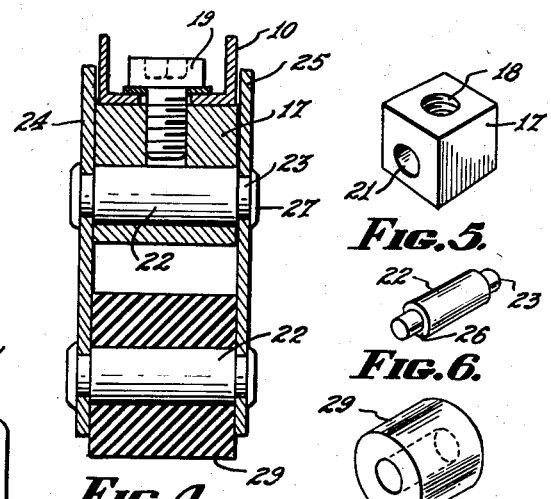
Figure 3:
Figure 2:
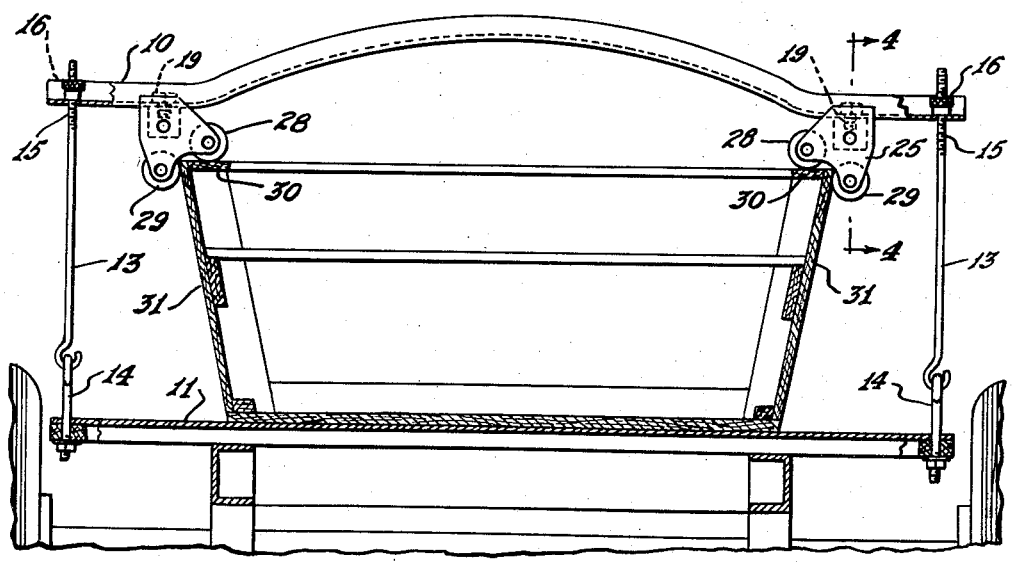

These and other objects and advantages of my invention will become apparent to those skilled in the art during the course of the following description and with reference to the accompanying sheet of drawings in which like numerals are employed to designate like parts throughout and in which:

Figure 1 is a top plan view showing the apparatus of my invention as employed to maintain a boat on a trailer, Figure 2 is an enlarged section taken on the line 2—2 of Figure 1, Figure 3 is a fragmentary plan view of the righthand portion of the structure as viewed in Figure 2, Figure 4 is an enlarged section taken on the line 4—4 of Figure 2, Figure 5 is a perspective view of one of the blocks employed in this invention, Figure 6 is a perspective view of certain pin members employed in this invention, and Figure 7 is a perspective view of one of the rubber bumpers used in the device of this invention.

Referring now to the drawings it will be apparent that my invention comprises the use of a bar to which bar a pair of blocks may be fastened at any desired point. A pair of plates is pivotally mounted on each block and each pair of plates serves to clamp a pair of rubber bumper members therebetween which are adapted to engage the top and side walls of a boat or the like. Threaded rods engage the ends of the bar and tie same to the trailer frame. The pivoted mounting of the plates on the slidable blocks insures that the rubber bumpers engage the top and side walls with approximately equal force.

Specifically, I provide a bar 10 which is generally U-shaped when viewed in cross-section, the legs of the U being turned upwardly. This bar may have an arcuate central portion, if desired, in order to accomodate boats and the like of various shapes and sizes. The base frame of the trailer or what-have-you is indicated at 11. The bar 10 may be fastened to the frame 11 by any suitable means. I have found it convenient to use a pair of rods 12 and 13, the rod 12 engaging a pin 14 to fasten it to the frame 11 while the rod 13 has a threaded portion 15 extending through the bar 10 and adapted to receive a nut 16 by means of which the bar 10 may be pulled towards the frame 11.

It will be apparent that the particular means for drawing the bar 10 towards the frame 11 are not critical to this invention. The rods 12 and 13 are employed at either end of the bar 10.

With the bar 10 I employ a pair of hold-down members which may be alike. I shall describe one in particular and it is understood that the other is like it. Such hold-down member comprises a block 17 which is bored and threaded as indicated at 18 to receive a bolt 19 by which it may be fastened to the bar 10. The bar 10 is slotted as shown at 20 to receive the bolt 19. This slot permits the block 17 to be shifted along the bar in order to accommodate boats of different sizes.

The block 17 is also bored as shown at 21 to receive a pin 22 having turned-down ends 23. The block 17, measured in the direction of the bore 21, is of slightly less length than the large diameter portion of the pin 22 for a reason which will become apparent shortly.

A pair of plates 24 and 25 are bored to receive the ends 23 of the pin 22. These plates abut the shoulder 26 of the pin 22 and the ends 23 are swaged as indicated at 27 to maintain the plates on the pin. The dimension of the block 17, as above indicated, is such that there will be a slight clearance between each edge thereof and the adjacent face of the plates 24 and 25. This construction will enable the plates 24 and 25 to pivot about the block 17 on the pin 22.

Between each pair of plates 24 and 25 I mount a pair of rubber bumpers 28 and 29. These may be mounted on additional pins 22. It is not necessary that the bumper 28 and 29 be able to rotate on the pins 22 and, therefore, on plates 24 and 25 may engage the ends of the bumpers in order to maintain them in secure position.

From the foregoing it will be apparent that each hold-down member comprises a block 17, a pair of plates 24 and 25, a pair of bumpers 28 and 29, and three pins 22 by which the plates are pivotally mounted on the block 17 and the bumpers 28 and 29 fixably mounted between the plates 24 and 25. The bolt 19 which secures the hold-down member to the bar 10 may slide in the slot 20 so as to position such member along the bar as desired.

In operation the pairs of hold-down members will be shifted along the bar 10 until the bumpers 28 and 29 engage the top and side walls 30 and 31 of a boat or the like. The pivoted mounting of the plates 24 and 25 on the blocks 17 permits adjustment of the bumpers 28 and 29 until they are brought to bear with substantially equal pressure on the top and sides of the boat. The bolts 19 may then be tightened to insure that the blocks 17 will maintain their selected position. Following this the bar 10 may be drawn towards the frame 11 by tightening the nuts 16. This will insure pressure being brought both downwardly and laterally of the boat so as to hold it firmly in position on the trailer. Although I have shown the use of one such hold-down means it is to be understood, as indicated in dotted lines in Figure 1, that additional means may be used if desired.

It is to be understood that although I have shown my invention as embodied in certain structures and arrangements, these are exemplary only. It will be apparent that various modifications may be made in the arrangement of my invention without departing from the scope and spirit thereof. Thus it will be further understood that I do not intend to be limited to the particular structures shown except insofar as they are specifically set forth in the subjoined claims.

Having thus described my invention, what I claim as new and what I desire to protect by United States Letters Patent is:

1. A hold-down device for maintaining an object on a base, said hold-down device comprising a bar to be placed across said object; fastening members connected to said bar and connectable to a said base whereby to draw said bar towards said base; a pair of hold-down members connected to said bar; each said hold-down member including a block connected to said bar, a first pin extending rotatably through a bore in said block, said pin having ends of reduced diameter forming shoulders, a pair of plates clamped on said ends against said shoulders, the distance between said shoulders being greater than the length of said bore whereby said plates may rotate with said pin and free of said block, and a pair of rubber bumpers carried between said plates and arranged to be engaged with the top and side of said object; said bar being slotted and said block being connected to said bar by means of a bolt passing through said slot whereby said block may be shifted along said bar throughout the length of said slot.

2. The hold-down device of claim 1 in which there are second and third pins fixed between said plates, each said second and said third pin having one of said bumpers fixed thereon between said plates.

3. A hold-down device for maintaining an object on a base, said hold-down device comprising a bar to be placed across said object; fastening members connected to said bar and connectable with a said base whereby to draw said bar towards said base; and a pair of hold-down members connected to said bar, each said hold-down member including a block connected to said bar, a pair of plates pivotally mounted on said block for swinging movement parallel to said bar and a pair of rubber bumpers carried between said plates and arranged to be engaged with the top and side of said object.

4. The hold-down device of claim 3 in which said bar is slotted and said block is connected to said bar by means of a bolt passing through said slot whereby said block may be shifted along said bar throughout the length of said slot.

References Cited in the file of this patent

UNITED STATES PATENTS

| | | |
|---|---|---|
| 1,708,231 | Moore et al. | Apr. 9, 1929 |
| 1,863,088 | Fedderman | June 14, 1932 |
| 2,361,529 | Briggs | Oct. 31, 1944 |
| 2,402,682 | Shiro et al. | June 25, 1946 |
| 2,715,008 | Hubber | Aug. 8, 1955 |
| 2,788,188 | Smith et al. | Apr. 9, 1957 |

FOREIGN PATENTS

| | | |
|---|---|---|
| 196,859 | Great Britain | May 3, 1923 |
| 1,018,386 | France | Oct. 15, 1952 |